BEST AVAILABLE COPY

United States Patent Office.

WILLIAM TERWILLIGER, WILLIAM H. TERWILLIGER, AND JOHN S. LOCKWOOD, OF NEW YORK, N. Y.

*Letters Patent No.* 56,680, *dated July* 24, 1866; *reissue No.* 2,508, *dated March* 12, 1867.

IMPROVEMENT IN CONSTRUCTION OF BURGLAR-PROOF SAFES, AND IN THE PREPARATION OF MATERIAL FOR THE SAME.

The Schedule referred to in these Letters Patent and making part of the same.

TO ALL WHOM IT MAY CONCERN:

Be it known that we, WILLIAM TERWILLIGER, WILLIAM H. TERWILLIGER, and JOHN S. LOCKWOOD, composing the copartnership of TERWILLIGER & Co., of the city, county, and State of New York, have invented a new and useful Improvement in the Construction of Burglar-Proof Safes, and in the Preparation of the Material for the Same; and we do hereby declare that the following is a full and exact description thereof.

The nature of the invention consists in making safes burglar proof by the use of plates or bars made by the combination of layers of iron and steel, welded together for the case, shell, or lining of such safes. This combination of iron and steel welded together prevents the successful use of the tools of the burglar; the hardened steel resisting the action of the drill, while the tenacity of the iron secures the plates from being broken by the blows of a hammer. Plates or bars of iron and steel welded together by any of the ordinary processes may be used for this purpose. But it is desirable in the construction of such safes that the alternate layers of iron and steel forming the plates or bars should be perfectly welded together throughout their entire extent. To accomplish this we use a welding composition made in the following manner:

We take equal parts of borax and saltpetre and grind them fine in alcohol, spirits of turpentine, benzine, or oil, to the consistence of cream, and cook it by boiling thoroughly in a close vessel, reducing the substances to a paint. This paint we lay on with a brush to the surfaces of iron and steel which are to be welded. It will dry immediately, the paint adhering evenly to the iron and steel. We then rivet together the corners of the plates and put them in the furnace to heat, having made the plates a little thicker, by one-eighth, than they are to be when finished. When the plates have become heated to a proper heat for being united, say 1,500° F., or thereabouts, we take them out and pass them between rollers under a pressure of some ten tons, the rolling being continued till the surfaces of the iron and steel have become thoroughly chemically identified or welded, forming one solid mass in a plate of the required thickness. Instead of the rollers an ordinary trip or other hammer may be used. These plates are then cut of any desired shape and size, and the holes punched that may be necessary in fastening them together with rivets in the formation of the safe. The plates are then hardened or tempered by any of the ordinary processes for that purpose. To prevent the warping of the plates in the process of hardening or tempering they may be placed in forms or under pressure. Plates thus composed of iron and steel chemically identified or welded by this process are superior to any formed by old methods. The weld is more uniform and perfect, and is accomplished without so much waste by oxidization or the weakening of the material caused by the interposition of the black oxide so common when welds are attempted to be effected over extensive surfaces in the ordinary way. A similar process is used for making the stiles or corners of the safe. They are bent, punched, hardened, and finished ready for use as angle iron. The parts being thus fashioned of proper shape, and fitted to each other so as to make a perfect outer or inner sheathing of plates or bars composed of iron and steel thus chemically identified or welded, they are set up in the safe form and riveted together with iron or steel rivets, or both, inserted at white heat and hardened or tempered by any of the ordinary modes.

What we claim as our invention, and desire to secure by Letters Patent, is—

1. The alternating of iron and steel welded together in plates or bars in making the lining, case, or shell of burglar-proof safes.

2. The process of welding iron and steel plates by the use of a solution of borax and saltpetre, (or their chemical equivalents for welding purposes,) in paint form, laid on the surfaces to be united, by being then heated to the proper heat, say 1,500°F., or thereabouts, and rolled under great pressure or hammered till chemically united or welded.

3. The alternating of iron and steel plates or bars united or welded by the use of the welding composition, applied, as above described, to make better and cheaper materials than those now used for burglar-proof safes.

W. TERWILLIGER,
WILLIAM H. TERWILLIGER
JOHN S. LOCKWOOD.

Witnesses:
HENRY WOODRUFF,
C. H. W. SIBLEY.